(12) United States Patent
McIntosh

(10) Patent No.: US 7,533,024 B1
(45) Date of Patent: *May 12, 2009

(54) AUTOMATED THIRD PARTY VERIFICATION SYSTEM

(75) Inventor: Jonathan P. McIntosh, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/692,995

(22) Filed: Mar. 29, 2007

Related U.S. Application Data

(60) Continuation of application No. 11/217,089, filed on Aug. 31, 2005, now Pat. No. 7,225,133, which is a continuation of application No. 10/043,868, filed on Nov. 1, 2001, now Pat. No. 6,990,454, which is a division of application No. 09/437,591, filed on Nov. 9, 1999, now Pat. No. 6,401,066.

(51) Int. Cl.
*G10L 17/00* (2006.01)
(52) U.S. Cl. .................................... 704/273
(58) Field of Classification Search ............... 704/273
See application file for complete search history.

(56) References Cited

U.S. PATENT DOCUMENTS

| | | |
|---|---|---|
| 3,752,904 A | 8/1973 | Waterbury |
| 4,752,676 A | 6/1988 | Leonard et al. |
| 4,993,068 A | 2/1991 | Piosenka et al. |
| 5,153,918 A | 10/1992 | Tuai |
| 5,412,727 A | 5/1995 | Drexler |
| 5,414,755 A | 5/1995 | Bahler |
| 5,504,805 A | 4/1996 | Lee |
| 5,513,250 A | 4/1996 | McAllister |
| 5,517,558 A | 5/1996 | Schalk |
| 5,581,630 A | 12/1996 | Bonneau, Jr. |
| 5,623,539 A | 4/1997 | Bassenyemukasa |
| 5,634,086 A | 5/1997 | Ritschev et al. |
| 5,638,430 A | 6/1997 | Hogan et al. |
| 5,664,050 A | 9/1997 | Lyberg |
| 5,666,157 A | 9/1997 | Aviv |
| 5,768,382 A | 6/1998 | Schneier et al. |
| 5,819,029 A | 10/1998 | Edwards |
| 5,838,768 A | 11/1998 | Sumar et al. |
| 5,862,325 A | 1/1999 | Reed et al. |
| 5,872,834 A | 2/1999 | Tietelbaum |
| 5,884,262 A | 3/1999 | Wise et al. |
| 5,903,225 A | 5/1999 | Schmitt et al. |
| 5,915,001 A | 6/1999 | Uppaluru |
| 5,940,476 A | 8/1999 | Morganstein |
| 5,987,155 A | 11/1999 | Dunn et al. |
| 6,011,858 A | 1/2000 | Stock et al. |

(Continued)

OTHER PUBLICATIONS

Associated Press, Telemarketing Firm Agrees To Alter Sales Policy, Times Union, Sep. 19, 2000, p. E.1.

(Continued)

*Primary Examiner*—Susan McFadden

(57) ABSTRACT

A system, method, and computer readable medium for providing third party verification data files to entities authorized to access said data files using a third party verification system, comprises obtaining a data file identifier of said data file stored in said verification system, searching and retrieving said data file corresponding to said data file identifier, and transmitting said data file to said authorized entity.

19 Claims, 11 Drawing Sheets

U.S. PATENT DOCUMENTS

| | | | |
|---|---|---|---|
| 6,038,334 | A | 3/2000 | Hamid |
| 6,049,602 | A | 4/2000 | Foladare et al. |
| 6,058,303 | A | 5/2000 | Åström |
| 6,070,241 | A | 5/2000 | Edwards |
| 6,084,967 | A | 7/2000 | Kennedy et al. |
| 6,088,731 | A | 7/2000 | Kiraly |
| 6,091,835 | A | 7/2000 | Smithies et al. |
| 6,092,192 | A | 7/2000 | Kanevsky et al. |
| 6,094,476 | A | 7/2000 | Hunt et al. |
| 6,119,084 | A | 9/2000 | Roberts |
| 6,144,938 | A | 11/2000 | Surace et al. |
| 6,149,056 | A | 11/2000 | Stinson et al. |
| 6,163,768 | A | 12/2000 | Sherwood et al. |
| 6,167,517 | A | 12/2000 | Gilchrist et al. |
| 6,266,640 | B1 | 7/2001 | Fromm |
| 6,275,940 | B1 | 8/2001 | Edwards |
| 6,292,480 | B1 | 9/2001 | May |
| 6,314,402 | B1 | 11/2001 | Monaco |
| 6,359,971 | B1 | 3/2002 | Haimi-Cohen et al. |
| 6,370,508 | B2 | 4/2002 | Beck et al. |
| 6,401,066 | B1 | 6/2002 | McIntosh |
| 6,501,956 | B1 | 12/2002 | Weeren et al. |
| 6,535,582 | B1 | 3/2003 | Harris |
| 6,604,075 | B1 | 8/2003 | Brown et al. |
| 6,650,736 | B1 | 11/2003 | Unger |
| 6,799,163 | B2 | 9/2004 | Nolan |
| 6,804,331 | B1 | 10/2004 | Vacek et al. |
| 6,862,343 | B1 | 3/2005 | Vacek et al. |
| 6,990,454 | B2 | 1/2006 | McIntosh |

OTHER PUBLICATIONS

Bruce, Laura, Face-Scanning, Fingerprinting ATMs Gain Ground, Bankrate.com, Mar. 2, 2001.
IBM, VoicePrint Security for Credit Cards, IBM TDB, Feb. 2004, pp. 189-190, Issue 37, 2B.
Iris Scan, Iris Recognition: The Technology, www.iris-scan.com.
ISA, Iris Recognition Could Smooth Identification, The Instrumentation, Systems, and Automation Society, www.isa.org, Jul. 31, 2000.
Mate CCTV, Ltd., Face Recognition Technology, www.mate.co.il.
Neurotechnologija, Ltd., Fingerprint and Eye Iris Pattern Identification Software, Libraries and Source Code, www.neurotechnologija.com, Apr. 15, 2002.
Niccolai, James, Comdex: Biometrics Puts a Face—or Finger—on Security, InfoWorld Media Group, Inc., Nov. 15, 2001.
Panasonic, Panasonic Authenticam Iris Recognition Camera, www.panasonic.com.
Pearson, Helen, Stats Say Aye to ID Eye, Nature News Service, www.nature.com.
PriceInteractive, PriceInteractive Launches Most Reliable Anti-Slamming Device, PR Newswire via News Edge, Jul. 1, 1999.
Triton Secure, www.tritonsecure.com.
VoiceLog, Bray Joins VoiceLog as Director of Live Operator Verification Services, Press Release, www.voicelog.com, Oct. 28, 2003.
VoiceLog, California Leads the Nation in Slamming Control, Press Release, www.voicelog.com, Mar. 27, 1998.
VoiceLog, FCC Acknowledges Validity, Value of Automated Third Party Verification, Press Release, www.voicelog,com, Aug. 24, 2000.
VoiceLog, Total Slamming Control—The Ultimate in Third Party Verification, Press Release, www.voicelog.com, May 11, 1998.
VoiceLog, VoiceLog and Telecommunications On Demand Announce Distribution Agreement, Press Release, www.voicelog.com, Nov. 12, 1997.
VoiceLog, VoiceLog and TSS AG (Switzerland) Bring Third Party Verification to Europe, Press Release, www.voicelog.com, Jan. 17, 2001.
VoiceLog, VoiceLog Announces Cost Effective Verification for Electric Service, Press Release, www.voicelog.com, Jan. 6, 1998.
VoiceLog, VoiceLog Announces CPNI Verification Products, Press Release, www.voicelog.com, Mar. 4, 1998.
VoiceLog, VoiceLog Announces Dual Channel Recording, Press Release, www.voicelog, com, Jan. 4, 2000.
VoiceLog, VoiceLog Announces Easy Recording Download Function, Press Release, www.voicelog, com, Mar. 1, 2000.
VoiceLog, VoiceLog Announces Free Speech TPV—Speech Recognition-Based Verification At Touchtone Prices, Press Release, www.voicelog.com, Jan. 6, 2004.
VoiceLog, VoiceLog Announces High Quality Name and Address Transcription, Press Release, www.voicelog, com, Feb. 1, 2000.
VoiceLog, VoiceLog Announces Inbound That Delivers, Press Release, www.voicelog, com, Oct. 2, 2000.
VoiceLog, VoiceLog Announces Live Operator Third Party Verification, Press Release, www.voicelog.com, May 1, 2001.
VoiceLog, VoiceLog Announces New Operations Center Added Location Provides Additional Capacity, Redundancy, Reliability, Press Release, www.voicelog.com, Mar. 1, 2002.
VoiceLog, VoiceLog Announces Package for New FCC Rules, Press Release, www.voicelog.com, Jan. 30, 2001.
VoiceLog, VoiceLog Announces Quick Freeze The New Third Party Verification Program for Carrier Freezes* to Meet the FCC Anti-Slamming Rules, Press Release, www.voicelog, com, Jan. 12, 1998.
VoiceLog, VoiceLog Announces True State-Specific Third Party Verification, Press Release, www.voicelog, com, May 9, 2000.
VoiceLog, VoiceLog Announces "Verifiably Able" New Program Offers Meaningful Employment to Physically Challenged, Press Release, www.voicelog.com, May 28, 2002.
VoiceLog, VoiceLog Announces Voice Recognition for Third Party Verifications, Press Release, www.voicelog.com, Nov. 4, 1997.
VoiceLog, VoiceLog Announces Web Interface for Verification Retrievals and Audio Playback, Press Release, www.voicelog, com.
VoiceLog, VoiceLog Announces Winter Weather Insurance For Third Party Verifications, Press Release, www.voicelog.com, Oct. 31, 1997.
VoiceLog, VoiceLog Appoints Karl Erickson As Chief Technology Officer, Press Release, www.voicelog.com, Oct. 7, 2002.
VoiceLog, VoiceLog Closes 1998 With Two Million Third Party Verification Transactions-Now the Leader in Preventing Slamming, Press Release, www.voicelog, com, Jan. 30, 1998.
VoiceLog, VoiceLog Goes to the Ends of the Earth to Review Third Party Verification, Press Release, www.voicelog, com, Feb. 29, 2000.
VoiceLog, VoiceLog Guarantees Third Party Verification Compliance, Press Release, www.voicelog.com, Sep. 23, 1997.
VoiceLog, VoiceLog Helps Telemarketers Meet New Telephone Sales Rule by Mar. 31 Deadline, No Need to Make Capital Investment to Record Telemarketing Sales, Press Release, www.voicelog.com, Mar. 12, 2003.
VoiceLog, VoiceLog Is First Choice for Third Party Verification, Press Release, www.voicelog, com, Aug. 10, 1998.
VoiceLog, VoiceLog Makes INC 500 List of Fastest-Growing Private Companies Second Straight Year, Press Release, www.voicelog.com, Oct. 3, 2003.
VoiceLog, VoiceLog Meets Anti-Slamming Rules for E-Commerce Internet Orders, Press Release, www.voicelog, com, Jan. 27, 1999.
VoiceLog, VoiceLog Offers Industry-Wide Solution to "Cramming", Press Release, www.voicelog.com, Apr. 21, 1998.
VoiceLog, VoiceLog Offers Sarbanes-Oxley Employee Hotline Solution, Press Release, www.voicelog.com, Oct. 7, 2003.
VoiceLog, VoiceLog Offers Third Party Verification for Wireless Number Portability, Press Release, www.voicelog,com, Oct. 31, 2003.
VoiceLog, VoiceLog Passes Half-Million Mark for Live Operator Verification Services Adds New Features and Functionality, Press Release, www.voicelog.com, Feb. 24, 2003.
VoiceLog, VoiceLog Ranked 77th in Inc Magazine's "Inc 500" for 2002, Press Release, www.voicelog.com, Oct. 15, 2002.
VoiceLog, VoiceLog Reaches 100 Accounts in 1997, Press Release, www.voicelog.com, Jan. 2, 1998.
VoiceLog, VoiceLog Releases Study on State Attitudes Towards FCC Anti-Slamming Rules, Press Release, www.voicelog.com, Apr. 14, 1999.
VoiceLog, VoiceLog Scores A Win For Telecom Industry Against "Drop-Off" Rule Seeks Partners for Potential Suit Against FCC to Overturn, Press Release, www.voicelog.com, Mar. 27, 2003.

VoiceLog, VoiceLog Third Party Verification Helps Telecommunications Industry Meet New FCC Anti-Slamming Rules, Press Release, www.voicelog.com, Dec. 20, 1998.

VoiceLog, VoiceLog Third Party Verification Releases Free Analysis of New FCC Anti-Slamming Rules, Press Release, www.voicelog.com, Feb. 9, 1999.

VoiceLog, VoiceLog Third Party Verification Releases Updated Anti-Slamming Rules Report, Press Release, www.voicelog.com, Mar. 16, 1999.

VoiceLog, VoiceVerified Helps Telemarketers Meet New FTC Sales Rule, Press Release, www.voicelog.com, May 1, 2003.

VoiceLog, VoiceLog's 50 State "Anti-Slamming Rules Report" Available on the Internet, Press Release, www.voicelog.com, Feb. 4, 1998.

Yang, S. Jae, A New Look In Security, PC Magazine, www.pcmag.com, Jan. 15, 2002.

Associated Press, Telemarketing Firm Agrees to Alter Sales Policy, Times Union, Sep. 19, 2000, p. E.1.

Bruce, Laura, Face-Scanning, Fingerprinting ATMs Gain Gound, Bankrate.com, Mar. 02, 2001.

IBM, VoicePrint Security for Credit Cards, IBM TDB, Feb. 2004, pp. 189-190, Issue 37, 2B.

Iris Scan, Iris Recognition: The Technology, www.iris-scan.com . 1999.

ISA, Iris Recognition Could Smooth Identification, The Instrumentation, Systems, and Automation Society, www.isa.org. Jul. 31, 2000.

MATE CCTV, Ltd., Face Recognition Technology, www.mate.co.il. Apr. 22, 2002.

Neurotechnologija, Ltd., Fingerprint and Eye Iris Pattern Identification Software, Libraries and Source Code, www.neurotechnologija.com, Apr. 15, 2002.

Niccolai, James, Comdex: Biometrics Puts a Face - or Finger - on Security, InfoWorld Media Group, Inc., Nov. 15, 2001.

Panasonic, Panasonic Authenticam Iris Recognition Camera, www.panasonic.com. Apr. 17, 2002.

Pearson, Helen, Stats Say Aye to ID Eye, Nature News Service, www.nature.com. Aug. 8, 2001.

PriceInteractive, PriceInteractive Launches Most Reliable Anti-Slamming Device, PR Newswire via News Edge, Jul. 01, 1999.

Triton Secure, www.tritonsecure.com Apr. 17, 2002.

VOICELOG, Bray Joins VoiceLog as Director of Live Operator Verification Services, Press Release, www.voicelog.com, Oct. 28, 2003.

VOICELOG, California Leads the Nation in Slamming Control, Press Release, www.voicelog.com, Apr. 27, 1998.

VOICELOG, FCC Acknowledges Validity, Value of Automated Third Party Verification, Press Release, www.voicelog.com, Aug. 24, 2000.

VOICELOG, Total Slamming Control - The Ultimate in Third Party Verification, Press Release, www.voicelog.com, May 11, 1998.

VOICELOG, VoiceLog and Telecommunications on Demand Announce Distribution Agreement, Press Release, www.voicelog.com, Nov. 12, 1997.

VOICELOG, VoiceLog and TSS AG (Switzerland) Bring Third Party Verification to Europe, Press Release, www.voicelog.com, Jan. 17, 2001.

VOICELOG, VoiceLog Announces Cost Effective Verification for Electric Service, Press Release, www.voicelog.com, Jan. 6, 2001.

VOICELOG, VoiceLog Announces CPNI Verification Products, Press Release, www.voicelog.com, Mar. 4, 1998.

VOICELOG, VoiceLog Announces Dual Channel Recording, Press Release, www.voicelog.com, Jan. 4, 2001.

VOICELOG, VoiceLog Announces Easy Recording Download Function, Press Release, www.voicelog.com, Mar. 1, 2000.

VOICELOG, VoiceLog Announces Free Speech TPV - Speech Recognition-Based Verification at Touchtone Prices, Press Release, www.voicelog.com, Jan. 6, 2004.

VOICELOG, VoiceLog Announces High Quality Name and Address Transcription, Press Release, www.voicelog.com, Feb. 1, 2000.

VOICELOG, VoiceLog Announces Inbound That Delivers, Press Release, www.voicelog.com, Oct. 02, 2000.

VOICELOG, VoiceLog Announces Live Operator Third Party Verification, Press Release, www.voicelog.com, May 1, 2001.

VOICELOG, VoiceLog Announces New Operations Center Added Location Provides Additional Capacity, Redundancy, Reliability, Press Release, www.voicelog.com, Mar. 1, 2002.

VOICELOG, VoiceLog Announces Package for New FCC Rules, Press Release, www.voicelog.com, Jan. 30, 2001.

VOICELOG, VoiceLog Announces Quick Freeze The New Third Party Verification Program for Carrier Freezes* to Meet the FCC Anti-Slamming Rules, Press Release, www.voicelog.com, Jan. 12, 1998.

VOICELOG, VoiceLog Announces True State-Specific Third Party Verification, Press Release, www.voicelog.com, May 9, 2000.

VOICELOG, VoiceLog Announces "Verifiable Able" New Program Offers Meaningful Employment to Physically Challenged, Press Release, www.voicelog.com, May 28, 2002.

VOICELOG, VoiceLog Announces Voice Recognition for Third Party Verifications, Press Release, www.voicelog.com, Nov. 4, 1997.

VOICELOG, VoiceLog Announces Web Interface for Verification Retrievals and Audio Playback, Press Release, www.voicelog.com, Jan. 9 2004.

Sample Record

| | | |
|---|---|---|
| 302 | Record Number | |
| 304 | Name | |
| 306 | Address | |
| 308 | Social Security # | |
| 310 | Birth Date | |
| 312 | Voice Recording (variable length record) | Name, Address, Telephone #, Social Security #, Birth Date Consent to Question 1 Consent to Question 2 |
| 314 | | |

Fig. 3

AUTOMATED THIRD PARTY VERIFICATION SYSTEM

CROSS-REFERENCE TO RELATED APPLICATION

This application is a continuation of and claims the benefit of U.S. patent application Ser. No. 11/217,089 filed on Aug. 31, 2005 now U.S. Pat. No. 7,225,133, which is a continuation of and claims the benefit of U.S. patent application Ser. No. 10/043,868 filed on Nov. 1, 2001 now issued U.S. Pat. No. 6,990,454 issued on Jan. 24, 2006, which is in turn a divisional of U.S. patent application Ser. No. 09/437,591, filed Nov. 9, 1999 now issued U.S. Pat. No. 6,401,066 issued on Jun. 4, 2002, the specification of which is hereby incorporated by reference as if set forth herein in its entirety. Further this application is related to and claims the benefit of U.S. patent application Ser. No. 10/186,208 which is a continuation-in-part of U.S. patent application Ser. No. 10/043,868, U.S. patent application Ser. No. 11/051,557 which is a continuation of U.S. patent application Ser. No. 10/043,868, U.S. patent application Ser. No. 11/217,090 which is a continuation of U.S. patent application Ser. No. 10/043,868, U.S. patent application Ser. No. 11/539,012 which is a continuation of U.S. patent application Ser. No. 10/186,208, and U.S. patent application Ser. No. 11/692,493 which is a continuation of U.S. Ser. No. 11/051,557.

FIELD OF THE INVENTION

This invention relates generally to remote data storage and retrieval systems and in particular to a system for recording and storing a response or request, such as a voice response.

BACKGROUND OF THE INVENTION

Due to advances in technology and a changing political and economic environment many industries are being freed from the constraints of government regulation and controlled monopolies. In particular, utilities such as long distance telephone service, cable, and most recently electric utilities, are now entering a free-market environment. This market trend allows companies providing utility services to compete for customers.

Out of competition and the desire for increased profits, companies desiring greater market share are now calling potential customers in an effort to convince or entice these potential customers to switch service providers. For example, a telephone long-distance service provider may call individuals to entice them to switch companies for their long distance service. To entice the potential customer to change service provider, the service provider often offer discounted service or rebates for changing service. Switching long distance service providers simply involves informing the local service carrier of the appropriate long distance service provider to allocate the long distance trunk usage to and change the appropriate billing to reflect the new service provider. Often the long distance service provider seeking new customers will waive any customer fees usually charged in hopes of reaping increased profits in the future.

In the past, if the potential customer agreed to change long distance service providers they would simply respond in the affirmative during the telephone call and the new long-distance service provider would independently call the local telephone service provider to effectuate the change. While this method worked well for a time, increased competition and entry into the market by unscrupulous businesses caused some long distance companies to enter into a practice known as slamming. In general, slamming comprises switching a customer's long distance service provider without the customer's prior authorization. A long distance carrier could 'slam' a customer by falsely reporting to the local telephone service provider that the customer had authorized the change. The local service provider would change the service as instructed and the customer, without any knowledge, would receive service from this new long distance service provider. The customer must then pay the new rate, which is often higher, to the new long distance service provider or undertake the process of changing back to their old service provider, often incurring a fee. The customer, having been slammed, had no way to prove they had not ordered the change.

While this example is specific to the long distance telephone industry, other businesses are susceptible to similar practices. For example, the potential exists for slamming in industries such as cable television, electricity, and even local telephone service.

In response to the widespread practice of slamming, the Federal Communications Commission (FCC) has adopted a requirements that before a customer is switch to a new long distance service provider third party verification must be obtained. Third party verification comprises verification by an entity independent from the long distance service provider.

Prior art methods of third party verification, while helpful to discourage slamming, suffers from several drawbacks. First, the process of third party verification is generally performed by independent live operators. Because the independent, third party live operators must be available when the calls are made to potential customers, the cost associated with advertising a new long distance service provider to a customer is increased because the additional labor costs associated with the additional live third party verification operators. This is especially true when numerous calls are simultaneously being made because numerous third party verifiers must be available to provide third party verification. Another disadvantage of using live operators is that the potential for fraud still exists in that only the word of the third party verifier supports the long distance service providers.

Of course, this is but one exemplary area where some form of independent verification would be helpful. Individuals today depend on telephones, computers and the Internet to conduct business that was previously conducted in person. For example, in the past a purchaser of a personal property item would have physically traveled to the store to purchase that item or met with the service provider to purchase a service. While the item may have been obtained on credit, the individual generally had to sign some form of credit agreement to thereby provide verification to the merchant of an obligation to pay the debit. The signature also verified receipt of the goods by the customer.

Due to the inconvenience of traveling to a merchant and the time constraints on individuals, the purchase of goods and/or services by telephone or Internet is becoming a more popular and widely adopted method of obtaining goods and/or services. The goods are shipped to directly to the customer and billed most often to a credit card. In the case of a service, the service is performed and the customer subsequently billed.

While this method of conducting business is convenient, it exposes the merchant or service provider to fraud. For example, after receiving the goods or service, certain dishonest customers have been known to deny that they ordered the goods or services. Conversely, certain dishonest merchants have been known to deliver unwanted goods, perform unwanted services and then subsequently bill for these unwanted goods and/or services, or even bill for services not performed. Because transactions are often performed via telephone or Internet, there is no way to verify that the customer actually ordered the goods or services. Hence, these types of transactions are subject to fraud.

Although the previously discussed examples involve the sale or goods or services, other situations beyond those of a commercial transaction may arise where some form of third party verification system may be beneficial. For example, various types of polling or petition drives could benefit from the convenience of being conducted by telephone or computer. However, previous attempts at such actions by telephone lacked reliability because of a lack of third party verification. Likewise, previous attempts were undesirably expensive because of the cost associated with live third party verification operators.

As discussed above, previous attempts at verifying an individuals decision, such as consent to purchase goods or services were inadequate for numerous reasons. One such inadequacy is that the obtained verification could not be independently confirmed beyond that of the third party verifier. Another reason previous attempts of verification were inadequate is because previous attempts, relying on live operators or verifiers, were prohibitively expensive. Yet another drawback of previous attempts involve the perpetration of fraud in the verification system because of collusion between the third party and the party hiring or controlling the third party.

Prior art attempts to provide some form of automated third party verification have several shortcomings. For example, some devices simply record the conversation with a potential customer or party on an analog tape. However, this type of system lacks means to retrieve the recording in a quick and convenient manner.

For the above mentioned reasons, a method is needed for providing rapid and inexpensive verification of a decision made by an individual located remote from the party requiring verification. It is preferred that the method and apparatus of verification have means for evidencing the agreement or consent of the party to others at a later time. Hence, the verification is preferably reproducible so that the verification can be provided to another at a later time.

Therefore, a need still exists for an automated third party verification system having the features and advantages described herein.

SUMMARY OF THE INVENTION

In accordance with the purpose of the invention as broadly described herein there is provided a verification system for use in a computer environment to provide independent third party verification in the form of audio or video files. Use of the verification system includes but is not limited to instances when an independent and verifiable record of consent or of a particular response to a question or series of questions is desired. In various situations the consent or response may obligate a person financially or in some other manner.

In one embodiment the verification system described herein comprises a PSTN compatible voice response unit configured to automatically receive a call. The voice response unit presents one or more voice scripts to the call and digitally records spoken answers provided by the individual participating in the call. The recorded answers are cataloged by a record number in a database and digitally stored on a computer storage device, such as a hard disk drive.

If the response of the person is ever called into question, the verification system includes means for the response to be retrieved from storage and restored to audio format. Various methods and apparatus may be adopted to perform the retrieval process.

In one embodiment the retrieval process occurs via telephone whereby an authorized user (client) calls the verification system and gains access to the system with passwords or passnumbers. Next, the client enters a record number identifier to retrieve the proper audio file record from the verification system storage device. Upon retrieval of the record, the voice response unit converts the file to an audio format for the client.

In another embodiment the retrieval process occurs via a computer network such as the Internet. In such an embodiment the verification system includes a computer network interface, such as an Internet server to facilitate access to the verification system by a client or other authorized third party via the Internet. To retrieve the verification data a client of the third party verification system accesses the verification system Internet server via the Internet and enters identification and password information to gain access to the record data. Next, the client identifies a record and instructs the verification system to retrieve the record. The verification system displays record information such as name and social security number. If the verification system retrieved the proper record the client downloads the audio or video verification file to their client computer over the Internet. The client may then play the audio or video file and may optionally patch in or connect other parties during the play back to provided the verification recording to other parties.

In one alternative embodiment, speech pattern recognition is utilized to provide further evidence of the recorded individuals statements. In an embodiment including speech pattern recognition, or voice fingerprint, the system performs signal processing on two or more speech samples to compare the speech patterns to identify if the same individual created both samples or audio recordings. In various configurations, the speech pattern recognition may be adopted for use in addition to or instead of the speech recording, storage and retrieval described above.

A detailed description of the present invention is provided below in conjunction with FIGS. 1-9.

BRIEF DESCRIPTION OF THE DRAWINGS

FIG. 3 illustrates a sample record of the third party verification system.

DETAILED DESCRIPTION OF THE PREFERRED EMBODIMENTS

1. Overview of the Invention

Figure 1:
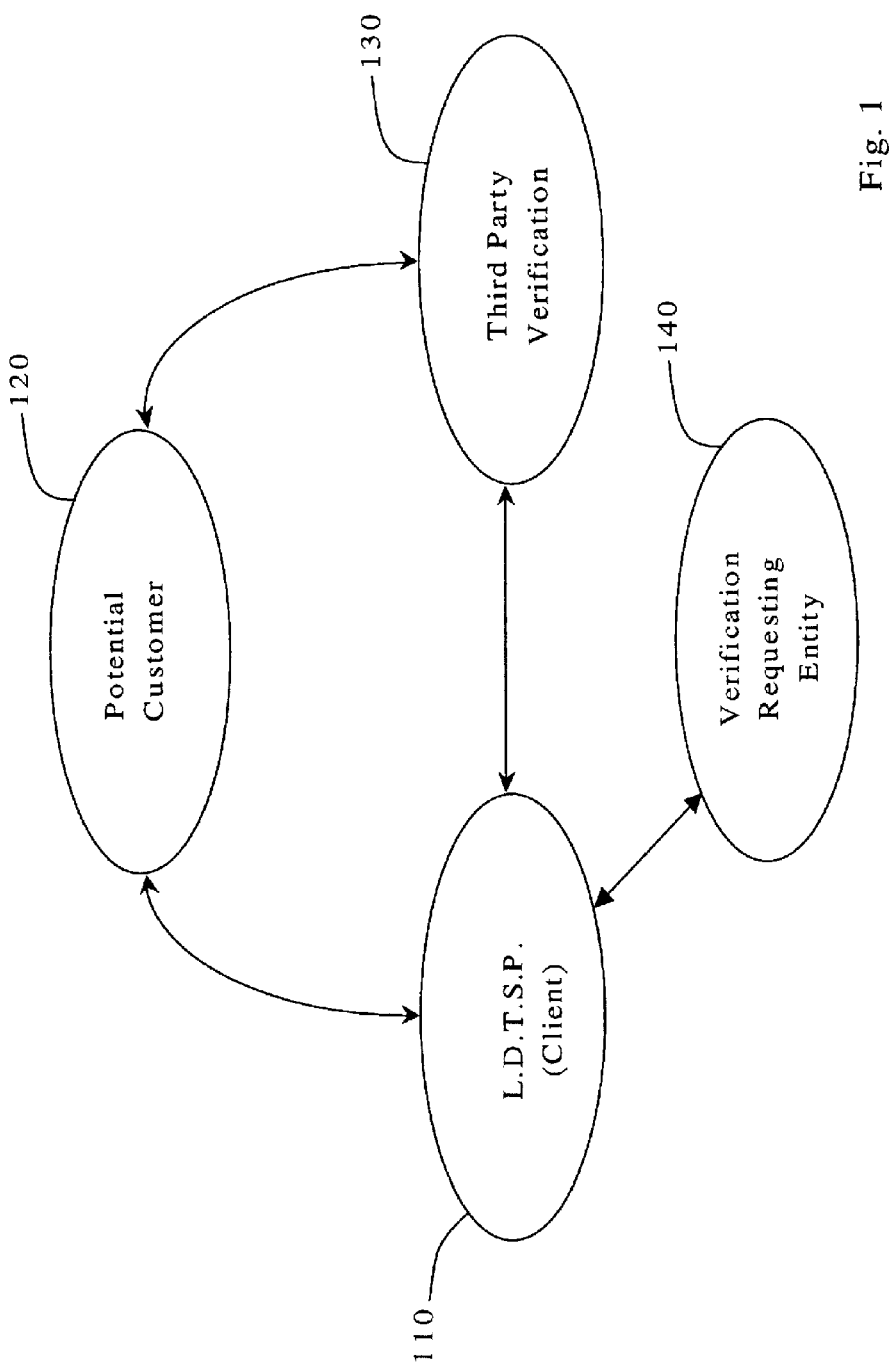
FIG. 1 illustrates a block diagram of the participants in a third party verification process.

In general, the present invention comprises a method and apparatus for obtaining, recording, storing, and retrieving third party verification of a statement or intent of an individual or entity. In one embodiment, the system of the present invention comprises a voice response unit capable of automatically receiving a call and presenting a number of questions to one or more individuals on the opposing end(s) of the line. The VRU records the responses to the questions in a digital format and subsequently stores and catalogs the responses by reference number on a server or other mass storage device. Stored responses provide verification of the answers to questions posed by the voice response unit.

Individuals having access may retrieve the stored verifications from the server via a telephone retrieval system or a computer interface such as the Internet. Stored responses confirm consent and thereby confirm and bind the recorded party to their statements.

2. Example Environment

Although other applications are possible, one example environment in which the subject invention can be implemented is a third party verification system as mandated by the Federal Communication Commission (FCC) anti-slamming provisions. In the example environment described herein, the present invention serves as a third party verification system for a long distance telephone service provider (the client) desiring to contact potential customers to gain market share. In general, long distance service providers desiring to increase market share call potential customers in hopes of convincing them to leave their existing long distance company. Upon confirming that the potential customer is interested in changing long distance companies, the customer is connected to the third party verification system so that the third party verification system described herein may obtain and permanently record the customer's verbal consent to the switch.

Next, the system stores the recorded vocal affirmation of the customer's desire to change long distance telephone service providers. The system stores the recording in digital form on a computer server so that it may be readily retrieved at a later date to thereby provide confirmation that the change in long distance service providers was indeed authorized.

To retrieve the customer's recorded consent an authorized party, such as the client, can retrieve or download the data via telephone or a customized Internet web server configured to access the voice recording.

Of course, this is but one possible environment of the present invention. Other possible environments that would benefit from the advantages of the present invention include but are not limited to other non-regulated or semi-regulated utilities such as electric utilities, cable utilities, cellular service providers, Internet service providers and the like. Other industries that may likewise benefit include any industry where products or services or offered or sold via telephone or computer such that some form of recorded statement, such as agreement to provide remuneration in exchange for a product or service, would benefit from the present invention. Other envisioned areas of use include polling, petition drives, telephone stock trading, voting, collection agencies, environments where confirmation is legally required, travel agents or airlines booking travel itineraries and tickets, mortgage brokers, banks, automotive or other vehicle service departments or any other entity requiring some form of verification.

3. First Embodiment

Although the present invention may be configured for use in numerous different fields, for purposes of understanding the present invention is described in a configuration of a third party verification system as used by long distance telephone service providers attempting to increase market share by direct calling telesales.

FIG. 1 illustrates the relationship between a long distance telephone service provider (L.D.T.S.P.) 110, a potential customer 120, and the third party verification system 130. In this embodiment the L.D.T.S.P. 110 is the client. The client is defined herein as the party, individual, or entity that requires third party verification and is responsible for initiating the verification recording process. In other embodiments the client may include but is not limited to, a pollster, a magazine subscription seller, seller, utility, order taker or other party described above desiring some form of verification of a transaction, statement or agreement at a later data.

It is contemplated at in one embodiment the L.D.T.S.P. 110 perform telesales at a location remote from the potential customer 120 and from the third party verification system 130. The L.D.T.S.P. 110 would thus contact potential customers 120 by telephone and upon obtaining customer consent to change long distance company the L.D.T.S.P. contacts the third party verification system 130. Eventually the customer is connected to the third party verification system so that consent to the change in telephone service can be permanently recorded for later verification. Hence communication occurs between each of the three entities 110, 120, 130.

After obtaining verifiable consent to change long distance service providers, another verification requesting entity 140 or the customer 120 may request verification of the consent to change long distance companies. Accordingly, communication between the L.D.T.S.P. 110 and the third party verification system 130 occurs. In an alternative embodiment the verification requesting entity 140 may directly contact the third party verification system 130.

In an alternative arrangement, an agent (not shown) performs telesales on behalf of the L.D.T.S.P. 110 thereby allowing the agent and the third party verification system 130 to be co-located.

Figure 2:
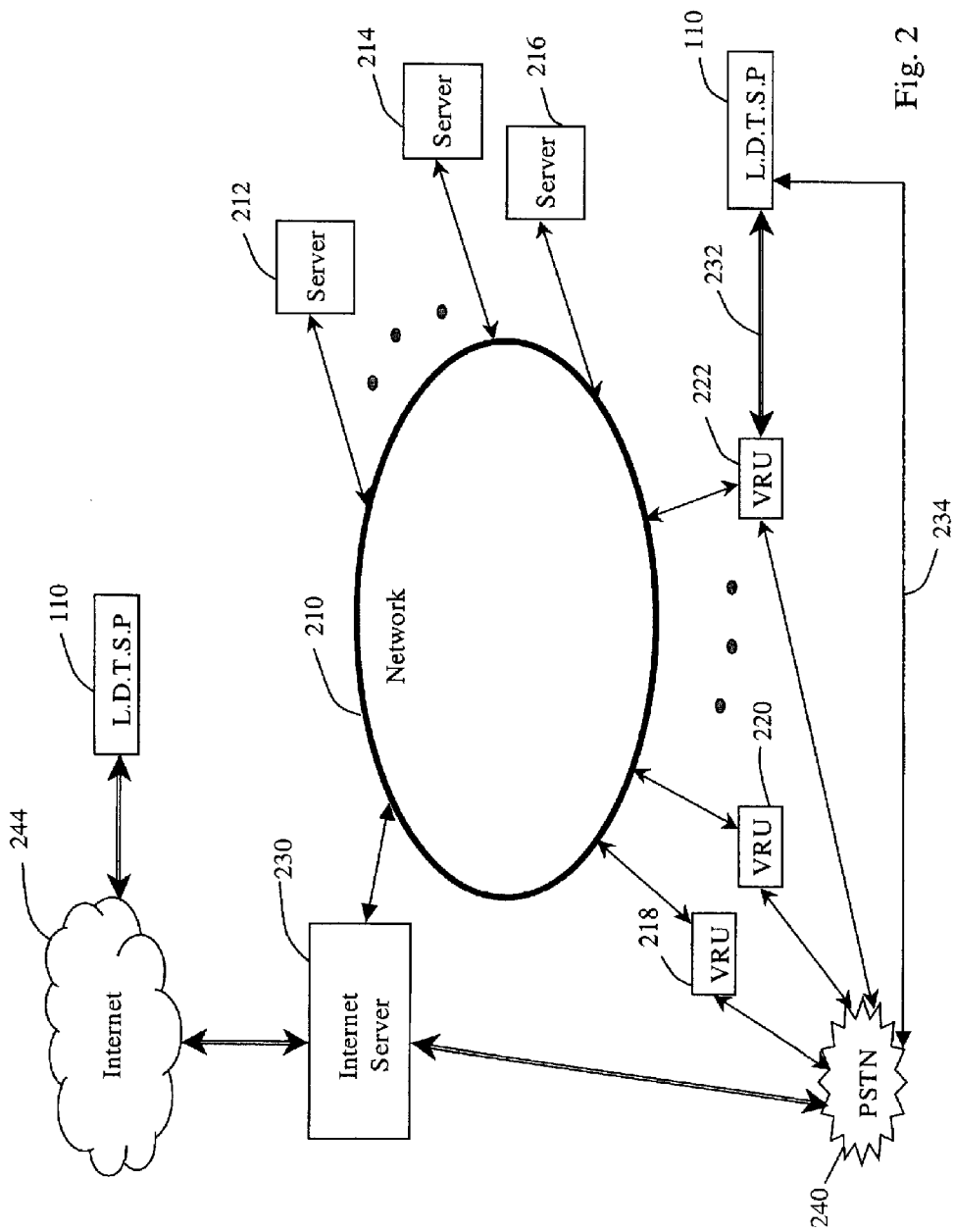
FIG. 2 illustrates a block diagram of a third party verification system.

FIG. 2 illustrates one example configuration of the third party verification system of the subject invention. As shown, a network 210 forms a center hub to facilitate communication between one or more servers 212, 214, 216, one or more voice response units (VRU) 218, 220, 222, one or more Internet servers 230, and various other support hardware (not shown). If remote from the third party verification system the L.D.T.S.P. 110, connects via a high capacity dedicated line 232 to a voice response unit of the third party verification system. Alternatively, the L.D.T.S.P. 110 may connect via a standard telephone communication line 234 to the PSTN 240, the PSTN in turn connecting to the voice response unit 218.

Each voice response unit 218 provides automated answering, voice response and dual tone multi-trequency (DTMF) monitoring of incoming calls. The voice response unit 218 of the subject invention comprises a Pentium based motherboard having various interfaces and connectors. In one embodiment the voice response unit comprises a housing containing a hard disk drive, a T1 card, a network (LAN) card and PSTN interface card, all of which operate, in once example embodiment, under a Unix operating system. Each voice response unit 218, configured in accordance with one embodiment of the present invention, includes additional software configured to transfer data to and from the voice print servers. In one embodiment this software is written in C programming language.

In one embodiment the interface card comprises a Dialogic card. The Dialogic card interfaces with the T1 card to provide the functionality of voice syntheses, and voice recording. The Dialogic card also includes means to store the digitized voice files before pushing the voice files to a voice print server. Dialogic Corp is located in North America at Parsippany, N.J.

In one embodiment the voice response unit 218 includes a dual T1 access configuration thereby providing access for 48 incoming lines, 47 of which are voice channels and one of which is a data channel. The data channel in conjunction with the T1 card carries and properly assigns ANI data to each of the 47 voice channels. In the embodiment described herein, each voice response unit 218 is shared among various clients 110 to thereby more fully utilize the resources of the third party verification system although it is contemplated that in other embodiments each voice response unit is dedicated to a particular entity. Each client 110, in one example, each L.D.T.S.P., is preferably provided a different access number to distinguish records from those of other L.D.T.S.P.

Each of the one or more voice response units 218 connects to the network. The network 210 may comprise any one of many various configurations of networks available for use at the present time, such as token ring, Ethernet, or other network that may be developed in the future. The network 210 provides data routing services to hardware connected thereto. In one embodiment the network 210 comprises a local area network.

Connecting to the network 210 are various servers 212-216. At least one server 212 is configured as a voice print server to store data records including digitized voice recordings evidencing verification or consent such as to a change in long distance service provider. Servers 212 having large storage capacity are known by those of ordinary skill in the art and accordingly are not discussed in great detail herein. In one embodiment the servers 212-216 may comprise a Pentium based processing device having an array of large capacity hard disk drive storage devices. In one embodiment the server 212 operates under the control of Linux operating system although in other embodiment other operating system may be adopted.

Each server 212 preferably includes some form of data base software to catalogue and manage each of the plurality of verification voice print records. One SQL-type data base software well suited to this particular task is available from Informix of Menlo Park, Calif. However, other data base programs such as DBZ and Oracle may also be configured to achieve the function of the present invention.

Also included in server 212 is associated disk drive array controllers, network cards, I/O cards and the like. As these types of devices are known by those of ordinary skill in the art, their construction and operation is not discussed in detail herein.

One or more Internet servers 230 also connect to the network 210. The Internet server 230 hosts software responsible for operation of the web site capable of providing access, via the network 210, to the voice print server 212 for record retrieval. Due to the wide spread expansion of the Internet 240, Internet servers are known by those of ordinary skill in the art. In one embodiment, the Internet server 230 comprises a Pentium based computer network server utilizing a windows based NT operating system or a Linux operating system. Apache Web Software hosts the third party verification system web page to thereby allow World Wide Web access to the recorded verification information.

The Internet server 230 connects to the Internet 240 and the PSTN 244 to facilitate access by a remote use, such as a L.D.T.S.P. 110 via the Internet or PSTN.

FIG. 3 illustrates an exemplary sample record 300 as might be recorded by a voice response unit 218 and stored on a voice print server 212 operating in accordance with the subject invention. Preferably each record 300 is arranged as a number of fields of information as is common in data base records. As shown, the example record 300 comprises a record number field 302 designed to identify the record at the exclusion of other records. Also included is a name field 304, address field 306, and field for other personal information, such as a social security number field 308, and birth date field 310. The personal information field are often used for security purposes to verify the identity of the individual. It is anticipated that the textual information contained in fields 302-310 is displayed on a computer screen or other form of display when the record is remotely accessed at a later time. Information displayed in fields 302-310 is obtained and entered by the L.D.T.S.P. caller and uploaded to the third party verification system or may be obtained by the third party verification system in non-verbal form.

The example record also includes a digitized voice recording field 312. The voice recording field 312 contains the digitized voice recordings of the individuals responses to questions posed by the voice response unit. Examples of the types of question that are presented by the voice response unit 218 include but are not limited to the individuals name, address, telephone number, social security number, birth date, and the responses to various questions posed by the voice response unit. The voice response unit 218 may of course be programmed with any of a number of application specific questions. In the example embodiment described herein the questions posed are directed to gain the consent from the customer or individual connected to the voice response unit to change long distance telephone service provider.

Additional storage fields 314 are optionally included in the record to provide additional flexibility to record additional information.

In other embodiments it is contemplated that the voice or computer text script could be adapted to record various other types of data including but not limited to voting, polling, purchasing, changing service providers, club membership, subscription purchasing, appointment scheduling, or other form of verification mentioned above.

4. Operation

In operation, the present invention may be configured to function with data recording and retrieval interfaces via a telephone or computer. For purposes of brevity only the Internet access and telephone access methods are discussed in detail herein. However, it is contemplated that other means of recording and accessing the data may be used to achieve the operation of the present invention.

Figure 4:
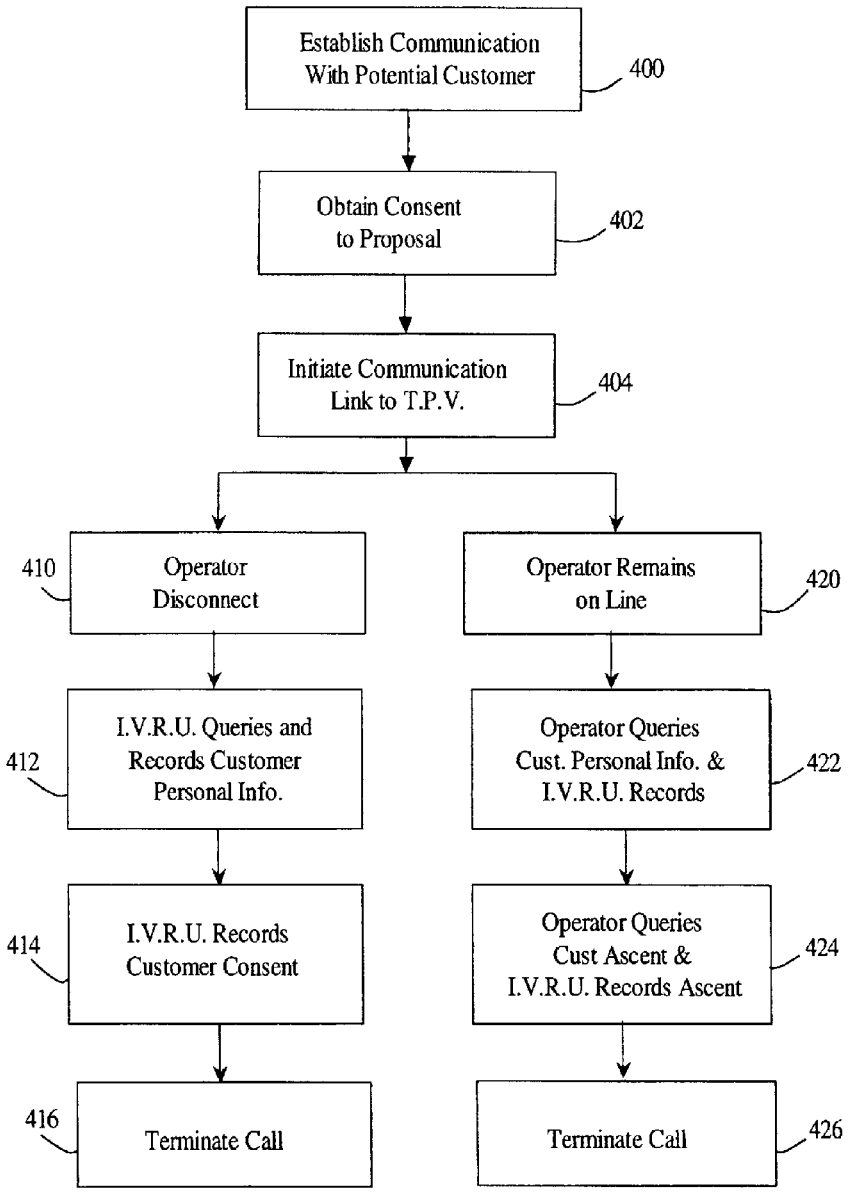
FIG. 4 illustrates an operational flow diagram of an example process for obtaining third party verification via a telephone connection.

FIG. 4 illustrates an operational flow diagram of one exemplary method of operation of the present invention. The operation shown, customized for obtaining consent from a potential customer, is utilized to obtain consent with third party verification from the potential customer. At a step 400, the operation establishes communication with a potential customer. Most often this is performed via a direct telephone connection over the PSTN although in other embodiments the communication link may exist over another medium.

Next, at a step 402, the operation attempts to obtain consent from the potential customer. Most often step 402 is achieved via personal voice communication by a live operator who is able to expressing the advantages of the proposed good or service, such as the new long distance carrier service, and interact with the potential customer.

While the personal and interactive communication from live operator contact often provides most productive, the process may also be initiated by a computerized and automated voice response unit that attempts to obtain third party verification prior to with communication from a live operator. Causing the voice response unit to initiate the call and obtain initial confirmation from the potential customer reduces the number of calls with which the live operator must interface thereby reducing the number of live operators and the cost of operation. Initial screening may be undertaken by recognizing DTMF tones provided by the potential customers in response to quires from the voice response unit.

Upon obtaining consent or other particular response, the operator initiates a communication link to a third party verification system. This occurs at a step 404.

Next, the operation branches to different routines depending on whether the operation will be a "blind transfer" or a "conference and transfer" type handoff. The left-hand branch of the details a blind transfer while the right-hand branch details a conference and transfer.

At a step 410, the operator disconnects from the line when the third party verification system connects or a short time before or after the third party verification systems connects. This is known as a blind transfer. Next, at a step 412, the interactive voice response unit (I.V.R.U.) queries and records customer information including but not limited to personal information regarding the potential customer. This information is temporarily stored in digital or analog format on the voice response unit.

Next, at a step 414, the interactive voice response unit queries the potential customer regarding consent to change long distance service providers and records the response. At a step 416 the process is terminated.

Alternatively, the operator may initiate a conference and transfer handoff as shown in steps 420-426. At a step 420, the operator stays on the line. Next, at a step 422 the operator queries the customer for personal information and records this information. At a step 424, the operator queries the customer for consent to change service providers, or any other question for which recorded verification is desired. Upon obtaining consent the call is terminated, step 426.

Figure 5:
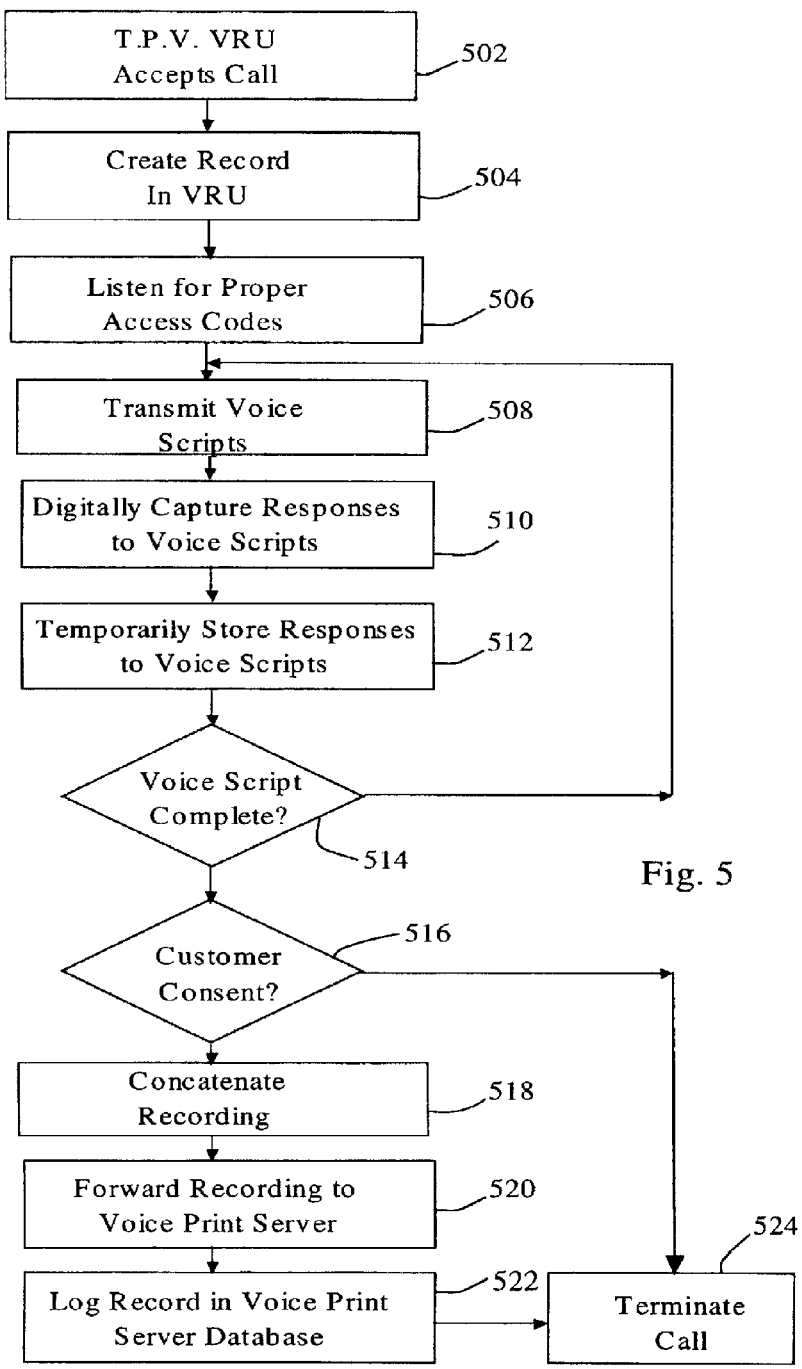
FIG. 5 illustrates a detailed operational flow diagram of an example process for obtaining third party verification via a telephone connection.

FIG. 5 illustrates a more detailed operational flow chart of one exemplary method of operation of third party verification recording by telephone. This operational flow chart provides a more detailed description of steps 404-416 shown in FIG. 4.

At a step 502, the voice response unit of the third party verification system accepts the call from an outside party or other system, such as an operator requiring third party verification. Next at a step 504, the voice response unit creates a record to store data from the potential customer. This record, as shown in FIG. 3, may include data as from DTMF tones or recorded voice or video clips of responses.

Next, at a step 506, the operation monitors for the proper access codes from the party requesting access to the third party verification system. Access codes or authorization code may be automatically sent from the requesting party telephone or may be manually entered as DTMF tones.

Upon gaining access to the system the operation progresses to a step 508 wherein the voice response unit transmits or plays voice scripts to the one or more parties connected to voice response unit, including the potential customer. It is anticipated that at least part of the voice script from the voice response unit requests interaction by the potential customer. Hence, at a step 510, the voice response unit captures the responses to the voice scripts.

In one alternative embodiment at least one question from the voice response unit is whether the potential customer consents to a particular statement and requests the potential customer to press a particular telephone key to express a particular response to a question from the voice response unit. The response of the DTMF tone directs the third party verification system to one or more branches to facilitate various lines of potential questioning.

Next, at a step 512, the voice response unit stores the voice responses to the questions or requests posed by the voice response unit. These verbal responses are digitized and temporarily stored in the voice response unit.

Next, the operation progresses to a decision step 514 wherein the operation determines if the voice scripts are complete. If the voice scripts are not complete, the operation returns to a step 508 wherein additional voice scripts are transmitted.

If at step 514, the voice script process is complete, the operation progresses to a decision step 516. Here the operation determines whether customer consent was provided or whether the desired response was obtained such that the record electronically existing in the voice response unit should be written to the voice print server. If the desired response was not obtained then the process terminates and the record information in the voice response unit is deleted. Alternatively, the record information in the voice response unit may be stored in a file containing failed or non-consenting records.

In one embodiment a speech recognition algorithm is utilized to determine if the desired response was provided. In another embodiment the voice response unit requests that in addition to a verbal response, a button be pressed to generate a DTMF tone to confirm a response.

If the potential customer provided the desired consent, the operation progresses to a step 518, wherein the voice response unit concatenates the recording of the personal information and the verbal consent or verbal responses to one or more particular questions, such as a desire to change long distance service providers. Next, at a step 520, the voice response unit forwards the data record over the network to the voice print server for cataloging and storage.

At a step 522, a voice print server data base program logs the record into data base storage system. Thereafter the operation progresses to step 524 wherein the call is terminated.

In this manner the vocal consent of the person or entity is recorded and stored using the third party verification system such that it may be retrieved as a form of verification at a later time.

Figure 6:
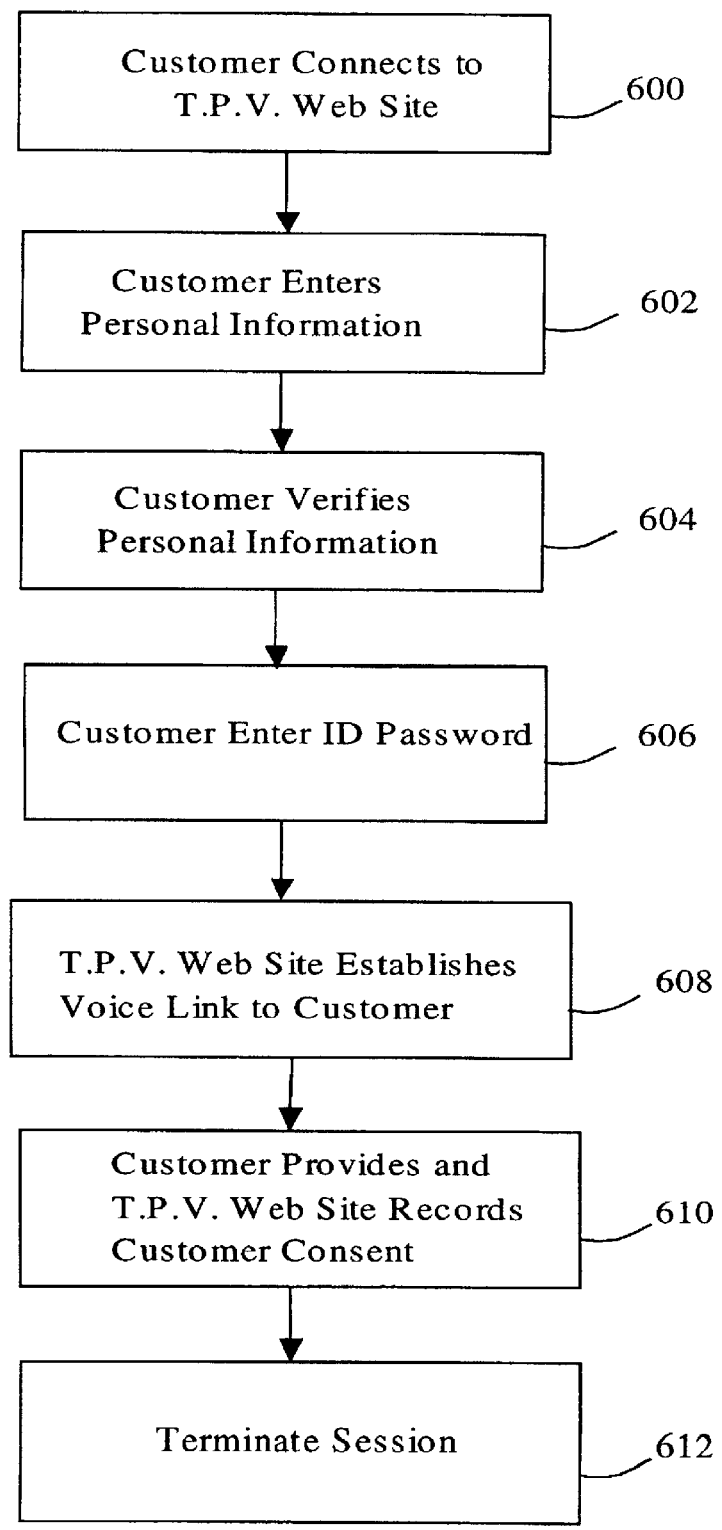
FIG. 6 illustrates an operational flow diagram of an example process when obtaining third party verification via a computer connection.

FIG. 6 illustrates an example method of operation for establishing a third party verification via the Internet. Using this example method of operation, a potential customer may initiate the process of changing long distance service providers. At a step 600, the potential customer connects to the third party verification web site and may optionally obtain information regarding any of a number of difference goods or services and personally select one of the goods or services to purchase.

Next, at a step 602, the operation requests that the customer enter personal information about themselves. Next, at a step 604, the operation verifies the potential customer's personal data.

At a step 606, the operation requests the potential customer to enter and upload an identification password or ID number. The identification password identifies the person to provide a verification of identity. For example, the identification password or ID number may be sent to the individual via mail to a verified address or may be provided by telephone at a verified telephone number. The ID number or password identifies the person for establishing verification. In an alternative embodiment, the third party verification web site detects the customers IP address based on ANI numbers or on packet switch data addresses.

Next, at a step 608, the operation establishes a voice link with the potential customer to facilitate recordation of a voice sample indicating consent to the change or query. For example, potential customer may consent to change long distance telephone service providers by transmitting a voice signal to the third party verification system. In an alternative embodiment, an audio file of the consent is recorded at the customer computer and uploaded to the third party verification system. In yet another embodiment the verification is recorded in a video format by a camera connected to the potential customer's computer or to a general use terminal for public use. This information is stored and at a step 612, the process terminates.

Figure 7:
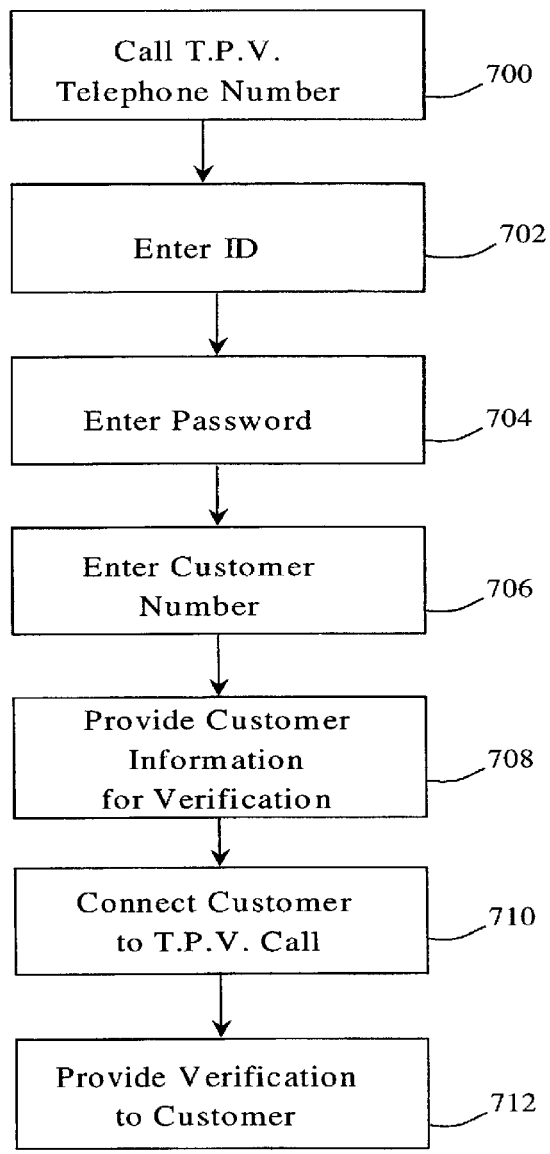
FIG. 7 illustrates an operational flow diagram of an example general process for retrieving third party verification via a telephone connection.

FIG. 7 illustrates an exemplary method of operation for retrieving the verification by telephone. A need exists to retrieve the recorded and stored verbal verification so that if, at a later time, verification of the consent or other response can be provided to a requesting party. The process of retrieving stored verification data comprises first calling the third party verification system, in this embodiment, by telephone at a step 700. Next, at a step 702, the calling party enters an identification number to gain access to the system. It is anticipated that the calling party be the client, such as a long distance service provider. In certain configurations parties other than the client may be provided access to the data stored in the third party verification system. Other such authorized individuals include the FCC or competitors.

Next, at a step 704, the client enters a password as a second requirement to gain access to the system. In alternative embodiment, access occurs automatically based on an analysis of the caller ID information of the calling party.

Next, at a step 706, the calling party enters the record number for which the verification is being sought. In one embodiment the record number is the telephone number for which long distance service is to be changed. In another embodiment the record number is randomly assigned. In one embodiment the requesting party generates DTMF tones to provide the record number. In another embodiment speech recognition software in conjunction with vocal input by the user to provide the record number.

Next, at a step 708, the third party verification system provides record data to the requesting party so that the requesting party may verify that the system retrieved the proper record. In one embodiment the record data provided at a step 708 includes name, address and some personal data such as birth date or mothers maiden name.

At a step 710, the requesting party connects a parties to the third party verification system so that the party connected to the third party verification system may listen to the voice recording of the recorded consent, step 712.

In reference to FIG. 1, the potential customer or an independent fourth party 140 such as the FCC or a prior provider of long distance service to the customer may request access to the verification system. In such a case, the client would call the third party verification system and, upon obtaining the proper record, patch in or connect the FCC or prior service provider to the call so that they can listen to the recorded verification.

Figure 8:
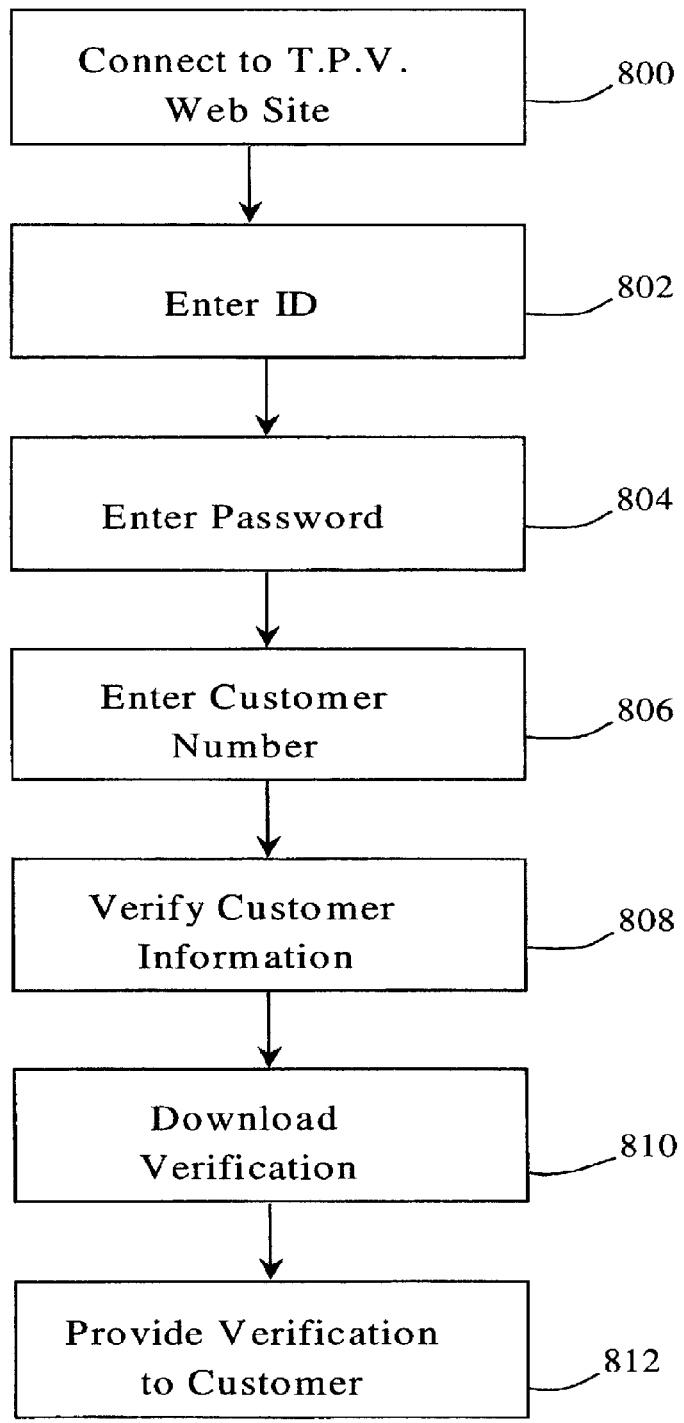
FIG. 8 illustrates an operational flow diagram of an example process for retrieving third party verification via a computer connection.

FIG. 8 illustrates an operational flow diagram of yet another embodiment of the present invention of one method of retrieving verification data over a computer network, such as the Internet. One general method of operation is shown in FIG. 8 wherein at a step 800, the client (user of the third party verification system) connects to a web site of the third party verification system. Once connected, the client enters their identification, step 802, and password, step 804. These steps control access to the web site.

Next, at a step 806, the operation queries the user for a record number or customer number. Upon uploading the record number to the web site server, the web site server accesses the voice printer server and downloads to the client of the third party verification system record information such as name, address and social security number of the customer identified by the record. This information is displayed on screen at the client machine. This allows the client to verify that the verification system retrieved the proper record from the voice print server.

Next, at a step 810, the operation allows the client to download the verification. In one embodiment the verification is a voice file of the customer that is downloaded to the client computer via the Internet. In another embodiment the verification is a video file containing video footage of a customer that is downloaded to the client computer via the Internet. The verification provides independent and third party obtained confirmation that the customer consented or responded in a particular manner to previous questions.

Next, at a step 812 the client provides the verification to the customer or to any party requesting the verification. In one embodiment wherein the party seeking the verification is connected to the client via telephone, audio verification is played to the party over the telephone or the audio file is transferred to the party, such as via e-mail. In another embodiment video verification is provided to the party via e-mail or video telephone.

Figure 9:
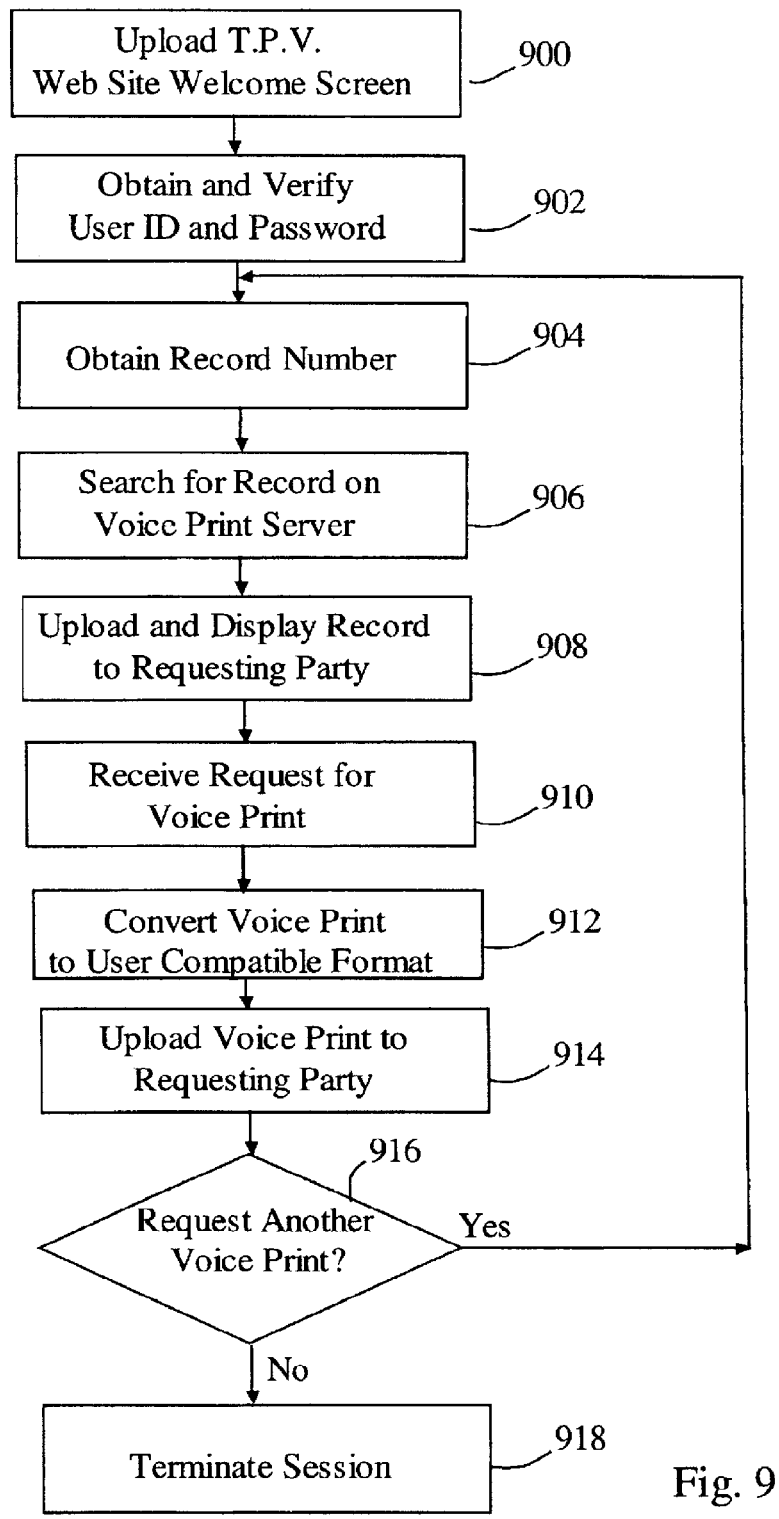
FIG. 9 illustrates a detailed operational flow diagram of an example process for retrieving third party verification via a computer connection.

FIG. 9 illustrates in detail a method of operation of retrieving third party verification over a computer connection such as the Internet. In a step 900, the client uploads a welcome screen from the third party verification web server. Next, at a step 902 the third party verification web server obtains and verifies the user identification and password against an existing data bases established by the operators of the third party verification system.

At a step 904, the web server obtains the record number from the client accessing the web site to gain the verification. In other embodiments the web site is advantageously accessible by others besides the client, such as customers, government agencies or competitors.

At a step 906, the web server accesses the voice print server to obtain the record data. Upon finding the data the web server causes the operation to upload the data to the accessing party's computer and display the record data on the display, step 908. Most often this data appears as a textual display. Transfer of data via a computer network, such as the Internet is known by those of ordinary skill in the art and accordingly is not described in great detail herein.

If the displayed information indicates that the web server retrieved the desired record then at a step 910, the web server would receive a request from the client for the verification file. The verification file may comprise data in an audio, video or other similar format that provides confirmation or verification of a response by a potential customer, individual, or entity. In one example embodiment, the verification file is an audio clip of a potential long distance telephone service customer consenting to change long distance service providers.

Next, at a step 912, the web server performs a conversion process on the voice print file to alter the alter the file to a format that may be understood by a personal computer connected to the computer network. In one example embodiment a Dialogic voice capture card records the voice of the party as they respond to questions. The recorded responses are converted to a digital format and are stored in an ADPCM format (adaptive differential pulse code modulation). In general, the ADPCM format is not compatible with personal computers and hence it must be converted to a new format, such as WAV format. This occurs at the step 912.

Next, at a step 914, the web server uploads the converted voice print file to the requesting party, such as for example, the client. The client can then listen to the voice print on their computer. Alternatively, the voice print can be patched into and played for a caller requesting verification or downloaded, such as via e-mail, to any desired party.

At decision step 916, the web server queries the client to download additional voice prints. If the client desires to access and download additional voice prints the process returns to a step 904. In the client does not have any other voice prints to down load then the operation progresses to a step 918, wherein the operation terminates, such as by automatically logging the client or user out of the web server.

5. Voice Fingerprint System

In another embodiment the above described third party verification system includes a voice fingerprint system configured to compare two or more samples of voice and pattern match the voice samples to determine if the two or more samples were spoken by the same individual. An embodiment of the present invention having the voice fingerprint system includes a hardware interface within the voice response unit. The voice fingerprint system analyzes a voice sample, such as a person speaking their first and last name. This voice sample analysis is stored and may be appended to the record data or stored separately. The voice sample is the voice fingerprint of the individual whereby through the use of complex sampling and statistical analysis a unique identification of the speaker's speech patterns, inflections, tone, and speech speed is created. This unique identification or fingerprint is then cataloged and stored with the particular record number.

If, at a later time, the consent or response of a person is questioned or if verification beyond that provided by the process described in FIGS. 4-9 is required, the stored voice finger print may be compared to a second sample taken from the individual. For example, if the individual refutes the recorded verification then they can call and undergo a second sampling, such as by speaking their first and last name. The voice fingerprint system analyzes the second sample and compares the results of the second sample to the stored results of the first sample. If the sample results match, then further conformation or verification is achieved. An example voice verification system compatible with this embodiment of the present invention is available from Nuance Communications of Menlo Park, Calif.

Figure 10A:
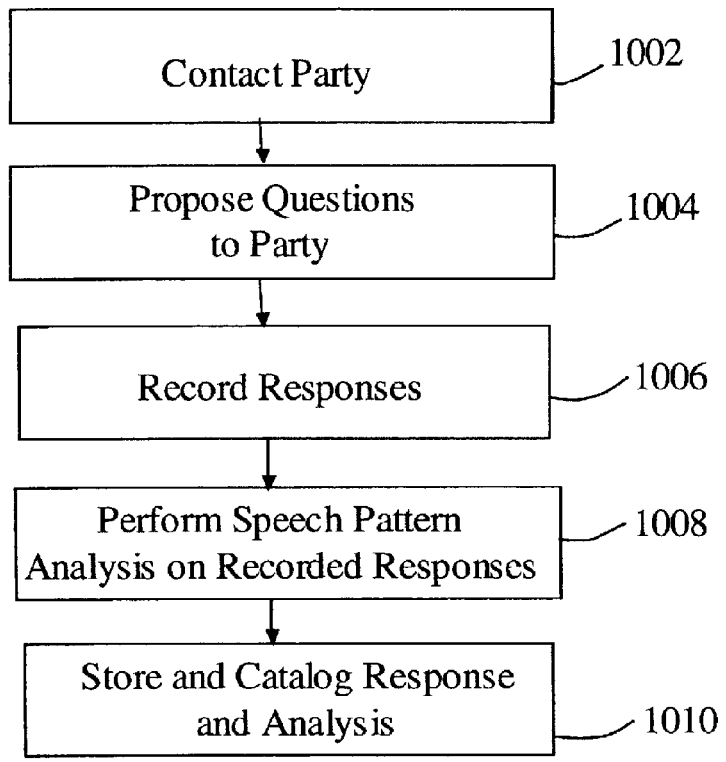
FIGS. 10A and 10B illustrate an operational flow diagram of an example process for third party verification including speech pattern recognition.
Figure 10B:
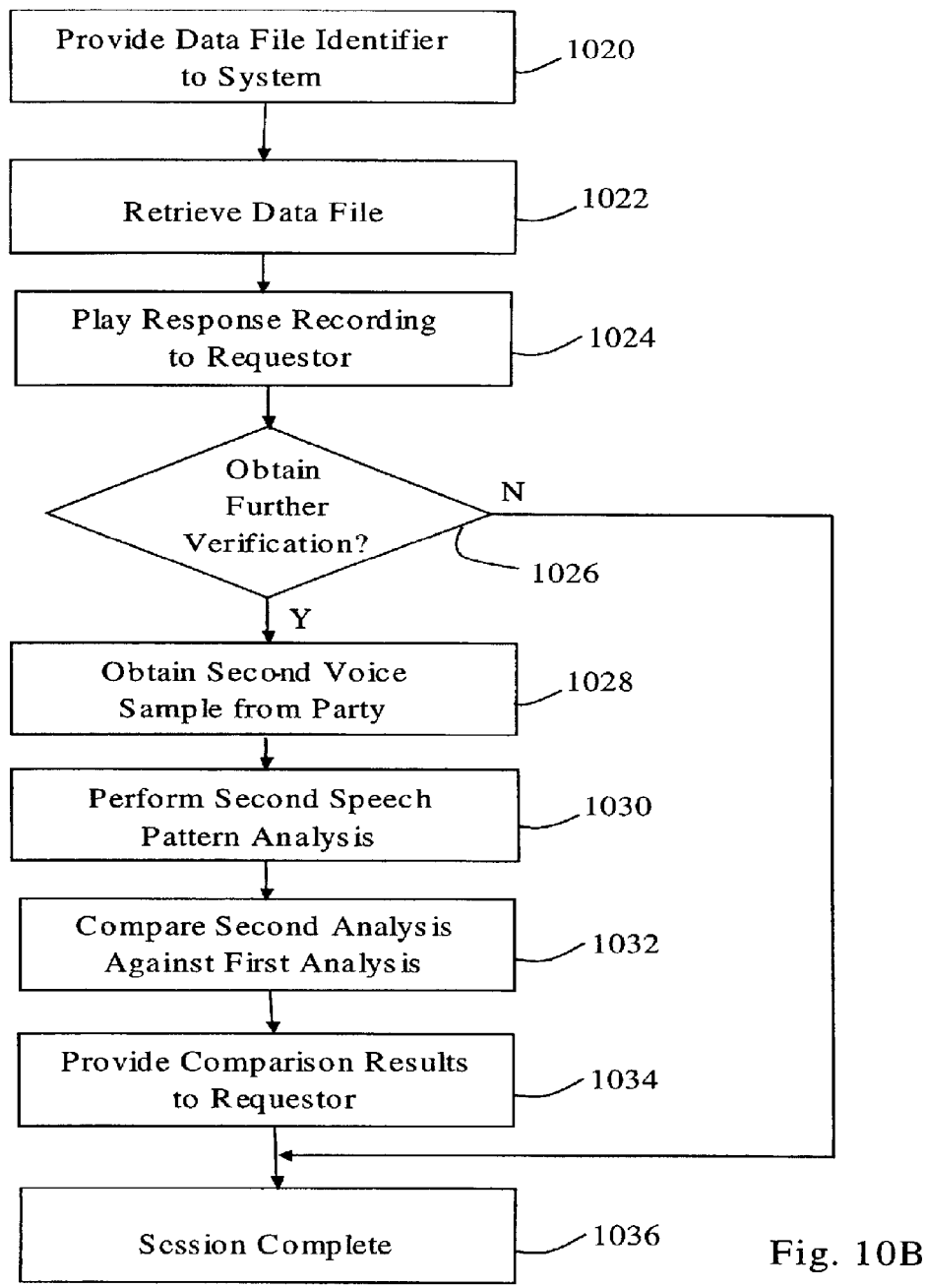

FIGS. 10A and 10B illustrate an operational flow diagram of an example process of the present invention having speech pattern recognition. The process is now discussed. Referring to FIG. 10A, at a step 1002, the operation contacts a party to obtain consent or a particular response. Next, at a step 1004, a voice response unit proposes questions to the party. The operation, at step 1006, records the responses to the questions. A single or a plurality of response may be recorded.

Next, at a step 1008, the operation performs speech pattern analysis on the recorded responses. In one embodiment the analysis occurs in real time when the party makes the response. In another embodiment the analysis occurs after the voice response unit records the response.

At a step 1010, the operation catalogs and stores the responses on a storage media, such as a hard disk drive. Once stored, the recorded response and analysis may be retrieved at a later date.

In reference to FIG. 10B, an operational flow diagram of a example method of retrieving the stored response and analysis and performing the voice verification. This process involves the sampling of a second speech sample so that the system can perform a second analysis and subsequently compare the two analysis to provide further verification of identity.

Turning now to FIG. 10B, at a step 1020 a user or requester of verification provides a data file identifier, often in the form of a numeric identifier, to the system. This identifies the data file, containing the response and analysis data, at the exclusion of other data files.

Next, at a step 1022, the operation retrieves the data file from storage device. At a step 1024, the operation plays the recording of the response for the requester. The playing of the response is a first form of verification.

Next, at decision step 1026, the operation inquires whether additional verification is required. If at step 1026 the requester desires further verification the operation progresses to a step 1028 wherein the system obtains a second voice sample from the party in question. It is contemplated that at least one voice response from the party be provided that is the same word or words as contained in the first recorded response. The second voice sample is preferably obtain from the party with a known identity. Thus, the identity of the second voice sample provider is preferably independently verified by some form of identification.

Next, at a step 1030, the operation performs speech pattern analysis on the second speech sample. In one embodiment this analysis is the same type of analysis as performed in step 1008 of FIG. 10A.

Next, at a step 1032, the operation compares the analysis results from the first speech pattern analysis, which were retrieved from storage, with the analysis of the second speech sample. This comparison reveals if the same party spoke the first speech sample and the second speech sample.

Next, at step 1034, the operation provides the results of the comparison to the requester. These may be provided via a computer network, over an Internet connection, audibly over a telephone connection, or any other means suitable for communicating results of the comparison. At a step 1036, the session is complete. Likewise, if at decision step 1026 the requestor does not require additional verification, the operation progresses to step 1036 and the session is complete.

The present invention provides a system, method, and computer readable medium for providing third party verification data files to entities authorized to access said data files using a third party verification system. In one embodiment, a method of providing third party verification data files to entities authorized to access said data files using a third party verification system, comprises obtaining a data file identifier of said data file stored in said verification system, searching and retrieving said data file corresponding to said data file identifier, and transmitting said data file to said authorized entity. The method also comprises verifying authorization to access at least one of: said third party verification system, and said data file, wherein said data file contains a digitally stored voice recording, wherein the recording is at least one of: an individual's live responses to questions, and an individual's recorded response to questions, wherein said transmitting said data file comprises at least one of: uploading said data file to a computer of said authorized entity, and receiving said data file by a computer of said authorized entity.

In another embodiment, a method of providing third party verification data files to entities authorized to access said data files using a third party verification system, comprises obtaining a data file identifier of said data file stored in said verification system, retrieving said data file corresponding to said data file identifier, and transmitting said data file to said authorized entity, wherein said data file contains a digitally stored voice recording of at least one response by an individual to at least one question. The method also comprises establishing a first communication link between said individual and the verification system, recording said individual's responses over said first communication link at said verification system, establishing a second communication link between a client computer and said verification system, logging said client computer onto said verification system, receiving a request for said data file from said client computer, and utilizing said data file for said verification authorization access, wherein said establishing a first communication link comprises establishing a communication link by telephone over at least one of: a public switched telephone network, a data network, a wireless network, and a wired network.

The method also comprises converting said data file to at least one of: a personal computer compatible format, and a wireless device compatible format, wherein said converting occurs prior to said transmitting, and wherein said second communication link utilizes a data network. The method also comprises playing said transmitted data file over a telephone connection to said authorized entity, verifying authorization to access at least one of: said third party verification system, and said data file, wherein said verifying is intended to provide verification for at least one of: a telephone service provider, a long distance telephone service provider, a utility service provider, an Internet service provider, a wireless service provider, and a cable service provider.

The method also comprises performing speech pattern analysis on said voice recording, obtaining additional data over said first communication link, performing speech pattern analysis on said additional data, and comparing results of said speech pattern analysis performed on said voice recording to results of said speech pattern analysis performed on said additional data.

In a further embodiment, a computer readable medium comprises instructions for: recording a response of a listening party to an inquiry, assigning said response with an identifier, storing said assigned response, and transmitting said stored assigned response based on said identifier.

In yet another embodiment, an automated third party verification system for use by an entity desiring to obtain and record audio or video verification of a response or action by an individual or entity, comprises a unit that: communicates an inquiry to a listening party and electronically records responses to said inquiry, catalogs by identifier said electronically recorded responses to aid in retrieval of said electronically recorded responses, and an interface communicably coupled to the unit that facilitates a retrieval of said electronically recorded responses.

While particular embodiments and examples of the present invention have been described above, it should be understood that they have been presented by way of example only and not as limitations. Those of ordinary skill in the art will readily appreciate that other various embodiments or configurations adopting the principles of the subject invention are possible. The breadth and scope of the present invention is defined by the following claims and their equivalents, and is not limited by the particular embodiments described herein.

I claim:

1. A method of providing third party verification data files to entities authorized to access said data files using a third party verification system, said method comprising:
    obtaining a data file identifier of said data file stored in said verification system;
    retrieving said data file corresponding to said data file identifier; and
    transmitting said data file to said authorized entity, wherein said data file contains a digitally stored voice recording of at least one response by an individual to at least one question.

2. The method of claim 1 comprising establishing a first communication link between said individual and the verification system.

3. The method of claim 2 comprising recording said individual's responses over said first communication link at said verification system.

4. The method of claim 1 comprising establishing a second communication link between a client computer and said verification system.

5. The method of claim 4 comprising logging said client computer onto said verification system.

6. The method of claim 4 comprising receiving a request for said data file from said client computer.

7. The method of claim 5 comprising utilizing said data file for said verification authorization access.

8. The method of claim 1, wherein said establishing a first communication link comprises establishing a communication link by telephone over at least one of:
    a public switched telephone network;
    a data network;
    a wireless network; and
    a wired network.

9. The method of claim 1 comprising converting said data file to at least one of:
    a personal computer compatible format; and
    a wireless device compatible format;
    wherein said converting occurs prior to said transmitting.

10. The method of claim 4, wherein said second communication link utilizes a data network.

11. The method of claim 4 comprising playing said transmitted data file over a telephone connection to said authorized entity.

12. The method of claim 1, comprising verifying authorization to access at least one of:
    said third party verification system; and
    said data file.

13. The method of claim 12, wherein said verifying is intended to provide verification for at least one of:
    a telephone service provider;
    a long distance telephone service provider;
    a utility service provider;
    an Internet service provider;
    a wireless service provider; and
    a cable service provider.

14. The method of claim 1 comprising performing speech pattern analysis on said voice recording.

15. The method of claim 2 comprising obtaining additional data over said first communication link.

16. The method of claim 15 comprising performing speech pattern analysis on said additional data.

17. The method of claim 16 comprising comparing results of said speech pattern analysis performed on said voice recording to results of said speech pattern analysis performed on said additional data.

18. A computer readable medium comprising instructions for:
- recording a response of a listening party to an inquiry;
- assigning said response with an identifier;
- storing said assigned response; and
- transmitting said stored assigned response based on said identifier to an authorized entity.

19. An automated third party verification system for use by an entity desiring to obtain and record audio or video verification of a response or action by an individual or entity, comprising:
- a unit that:
  - communicates an inquiry to a listening party and electronically records responses to said inquiry;
  - catalogs by identifier said electronically recorded responses to aid in retrieval of said electronically recorded responses; and
- an interface communicably coupled to the unit that facilitates a retrieval of said electronically recorded responses and transmits such responses to an authorized entity.

* * * * *